US012570463B2

(12) United States Patent
Schumacher et al.

(10) Patent No.: US 12,570,463 B2
(45) Date of Patent: Mar. 10, 2026

(54) METHOD AND SYSTEM FOR MONITORING WEIGHT/ORIENTATION OF A SELF-CONTAINED CLIMATE CONTROLLED STORAGE UNIT AND ADJUSTING OPERATION BASED ON THE MONITORED WEIGHT/ORIENTATION

(71) Applicant: THERMO KING LLC, Minneapolis, MN (US)

(72) Inventors: Ryan Wayne Schumacher, Bloomington, MN (US); Jason Tilghman, Minneapolis, MN (US); Matthew Srnec, Minnetonka, MN (US); Srinivasa Rao Koppineedi, Eagan, MN (US); Paul J. Kroes, Eden Prairie, MN (US)

(73) Assignee: THERMO KING LLC, Minneapolis, MN (US)

( * ) Notice: Subject to any disclaimer, the term of this patent is extended or adjusted under 35 U.S.C. 154(b) by 666 days.

(21) Appl. No.: 18/056,467

(22) Filed: Nov. 17, 2022

(65) Prior Publication Data

US 2024/0166430 A1 May 23, 2024

(51) Int. Cl.
| | |
|---|---|
| *B65D 90/48* | (2006.01) |
| *B65D 88/74* | (2006.01) |
| *B60H 1/00* | (2006.01) |

(52) U.S. Cl.
CPC ............. *B65D 90/48* (2013.01); *B65D 88/74* (2013.01); *B60H 1/00007* (2013.01); *B65D 2588/74* (2013.01)

(58) Field of Classification Search
CPC .... B65D 90/48; B65D 88/74; B65D 2588/74; B60H 1/00007; F25D 29/003; F25D 2700/00; F25D 11/003
See application file for complete search history.

(56) References Cited

U.S. PATENT DOCUMENTS

| | | | | |
|---|---|---|---|---|
| 4,991,402 A | * | 2/1991 | Saia, III | ................. F25D 3/105 |
| | | | | 62/239 |
| 5,598,713 A | * | 2/1997 | Bartilucci | ............... F25D 3/105 |
| | | | | 62/384 |

(Continued)

FOREIGN PATENT DOCUMENTS

| | | |
|---|---|---|
| WO | 2022/101553 | 5/2022 |

OTHER PUBLICATIONS

Extended European Search Report, issued in the corresponding European patent application No. 23210529.6, dated Mar. 18, 2024, 7 pages.

*Primary Examiner* — Nha T Nguyen
(74) *Attorney, Agent, or Firm* — HSML P.C.

(57) ABSTRACT

An electrically powered portable self-contained climate controlled storage unit that is self-weighing and/or measures its orientation. The storage unit includes a base including an enclosure and at least one foot for supporting the self-contained climate controlled storage unit, a climate controlled space affixed above the base, and a climate control system for providing climate control to the climate controlled space. The climate control system is provided in the enclosure. The storage unit further includes at least one sensor for measuring a weight and/or orientation associated with the self-contained climate controlled storage unit and a system controller connected to the self-contained climate controlled storage unit. The system controller is configured to determine an unsafe operating condition of the self-contained climate controlled storage unit based on the weight and/or orientation associated with the self-contained climate controlled storage unit measured by the sensor.

15 Claims, 8 Drawing Sheets

(56) References Cited

U.S. PATENT DOCUMENTS

| | | | |
|---|---|---|---|
| 5,791,150 | A | 8/1998 | Bosher et al. |
| 5,953,928 | A | 9/1999 | Saia, III et al. |
| 7,152,417 | B2 | 12/2006 | Morishita et al. |
| 7,592,916 | B2 | 9/2009 | Staples |
| 7,714,708 | B2* | 5/2010 | Brackmann ............... B60P 3/14 |
| | | | 180/290 |
| 8,483,942 | B2 | 7/2013 | Watanabe |
| 8,683,711 | B2 | 4/2014 | Han et al. |
| RE45,012 | E | 7/2014 | Jones et al. |
| 9,044,521 | B2 | 6/2015 | Farren |
| 9,082,103 | B2 | 7/2015 | Breed |
| 9,290,104 | B2 | 3/2016 | Gadh et al. |
| 10,014,722 | B2 | 7/2018 | Kuennen et al. |
| 10,110,006 | B2 | 10/2018 | Wood et al. |
| 10,141,770 | B2 | 11/2018 | Partovi |
| 10,538,211 | B2 | 1/2020 | Srnec et al. |
| 10,545,509 | B1* | 1/2020 | Jessen .................. G05D 1/0291 |
| 10,680,215 | B2 | 6/2020 | Morita et al. |
| 10,933,825 | B2 | 3/2021 | Schumacher et al. |
| 10,951,047 | B2 | 3/2021 | Neeld |
| 10,955,153 | B2 | 3/2021 | Arndt |
| 11,130,387 | B2 | 9/2021 | Adetola et al. |
| 11,629,911 | B2* | 4/2023 | Kuhn .................... B65D 81/18 |
| | | | 62/79 |
| 2004/0226309 | A1 | 11/2004 | Broussard |
| 2005/0232747 | A1 | 10/2005 | Brackmann et al. |
| 2006/0064993 | A1* | 3/2006 | Tofflemire ........... B65D 90/021 |
| | | | 62/239 |
| 2008/0270076 | A1 | 10/2008 | Breed |
| 2011/0067852 | A1* | 3/2011 | Farrar .................... B65D 88/74 |
| | | | 165/59 |
| 2013/0033381 | A1* | 2/2013 | Breed ................ G08B 13/2417 |
| | | | 340/568.1 |
| 2013/0079959 | A1* | 3/2013 | Swanson ................. B61C 17/12 |
| | | | 701/19 |
| 2017/0108261 | A1* | 4/2017 | Broussard ............. F25D 11/003 |
| 2018/0152044 | A1* | 5/2018 | Srnec ........................ B60P 3/20 |
| 2019/0233211 | A1* | 8/2019 | Luo ........................... F25D 3/06 |
| 2019/0301923 | A1* | 10/2019 | Barreto .................... F25D 23/00 |
| 2020/0232686 | A1 | 7/2020 | Arnedo et al. |
| 2021/0059455 | A1* | 3/2021 | Bowman ................ B65D 81/18 |
| 2021/0094772 | A1* | 4/2021 | Zhao .................... B65D 88/745 |
| 2021/0160327 | A1* | 5/2021 | Jantzi ...................... H04L 67/12 |
| 2021/0310853 | A1* | 10/2021 | Kochanowski ...... B65D 88/522 |
| 2022/0026139 | A1* | 1/2022 | LaValley ............... F25D 11/003 |
| 2023/0227250 | A1* | 7/2023 | Grip ..................... F25D 29/003 |
| | | | 62/371 |
| 2023/0356927 | A1* | 11/2023 | Edvinsson .............. F25D 17/08 |
| 2023/0419240 | A1* | 12/2023 | Aalto .................... B65D 43/16 |

* cited by examiner

410

415

424

θ

420

440

METHOD AND SYSTEM FOR MONITORING WEIGHT/ORIENTATION OF A SELF-CONTAINED CLIMATE CONTROLLED STORAGE UNIT AND ADJUSTING OPERATION BASED ON THE MONITORED WEIGHT/ORIENTATION

FIELD

This disclosure relates generally to a self-contained climate controlled storage unit. More particularly, the disclosure relates to a method and system for monitoring a weight and/or orientation associated with the self-contained climate controlled storage unit and adjusting operation based on the measured weight and/or orientation.

BACKGROUND

A self-contained climate controlled storage unit, such as a refrigerated air freight container (e.g., Air100-RKN and AIR200-RAP from Thermo King and Envirotainer®, etc.), a portable refrigeration container (e.g., ColdCube™ container from Thermo King, Coldtainer® from Thermo King, etc.), etc., provides portable climate controlled storage for cargo (e.g., produce, frozen foods, pharmaceuticals, etc.). In some instances, the cargo can be high value/critical cargo. Self-contained climate controlled storage units are typically battery powered. The battery typically requires charging prior to transport so that the unit can provide and maintain climate control (e.g., temperature, humidity, pressure, etc.) without relying on external power. In many instances, regulatory agencies (e.g., Federal Aviation Administration—FAA, etc.) and trade associations (e.g., International Air Transport Association—IATA, etc.) provide regulations that impose strict performance specifications on self-contained climate controlled storage units. Failure to meet these regulations can result in refusal of certification and entry into, for example, an aircraft.

SUMMARY

This disclosure relates generally to a self-contained climate controlled storage unit. More particularly, the disclosure relates to a method and system for monitoring a weight and/or orientation associated with the self-contained climate controlled storage unit and adjusting operation based on the measured weight and/or orientation.

In an embodiment, the self-contained climate controlled storage unit includes weight sensors, such as, load cells, or pressure sensors, for self-weighing of the climate controlled storage unit. For example, in an embodiment the weight sensors can be provided in the feet of the self-contained climate controlled storage unit or can be provided as a load cell plate between the climate controlled space and the base of the self-contained climate controlled storage unit.

In an embodiment, an electrically powered portable self-contained climate controlled storage unit is provided. The storage unit includes a base having an enclosure and at least one foot for supporting the self-contained climate controlled storage unit, a climate controlled space affixed above the base, a climate control system for providing climate control to the climate controlled space, at least one sensor for measuring a weight and/or orientation associated with the self-contained climate controlled storage unit, and a system controller connected to the self-contained climate controlled storage unit. The system controller is configured to determine an unsafe operating condition of the self-contained climate controlled storage unit based on the weight and/or orientation associated with the self-contained climate controlled storage unit measured by the sensor.

In another embodiment, a method for monitoring a weight and/or orientation of an electrically powered portable self-contained climate controlled storage unit is provided. The method includes monitoring a weight and/or orientation associated with the self-contained climate controlled storage unit using at least one sensor, and determining, based on the measured weight and/or orientation, whether the self-contained climate controlled storage unit is in an unsafe operating condition. Upon determining that the climate controlled storage unit is in the unsafe operating condition, the method includes adjusting operation and/or the orientation of the self-contained climate controlled storage unit. The self-contained climate controlled storage unit includes a base having an enclosure and at least one foot for supporting the self-contained climate controlled storage unit, a climate controlled space affixed above the base, and a climate control system for providing climate control to the climate controlled space that is provided in the enclosure.

As such, the electrically powered portable self-contained climate controlled storage unit has at least the following advantages.

The self-contained climate controlled storage unit self-weighing such that the weight of the storage unit and/or the weight of the cargo inside the storage unit can be determined for determining transportation and handling logistical requirements during transport and/or handling. For example, the weight may be needed for shipment or transport carrier restrictions, e.g., due to weight limits/restrictions for the transport unit, such as, airplanes, railways, trucks, semi-tractors, or other similar transport units, and for cargo transport/delivery, e.g., for bills of lading, handling equipment, etc.

External scales are not required to measure the weight of the self-contained climate controlled storage unit and/or the cargo placed inside the self-contained climate controlled storage unit. Such scales have limited functionality to self-monitor the self-contained climate controlled storage unit, especially during transport and/or handling, e.g., the scales are only used for measuring the weight before or after the transport and/or the handling.

The self-contained climate controlled storage unit is able to self-monitor its orientation based on weight or a second sensor that measure inclination angles. As such, the storage unit can determine if the storage unit is in an unsafe operating condition and take appropriate actions to mitigate or minimize damage to any of the system components.

BRIEF DESCRIPTION OF THE DRAWINGS

References are made to the accompanying drawings that form a part of this disclosure and which illustrate the embodiments in which systems and methods described in this specification can be practiced.

3

Figure 5A:
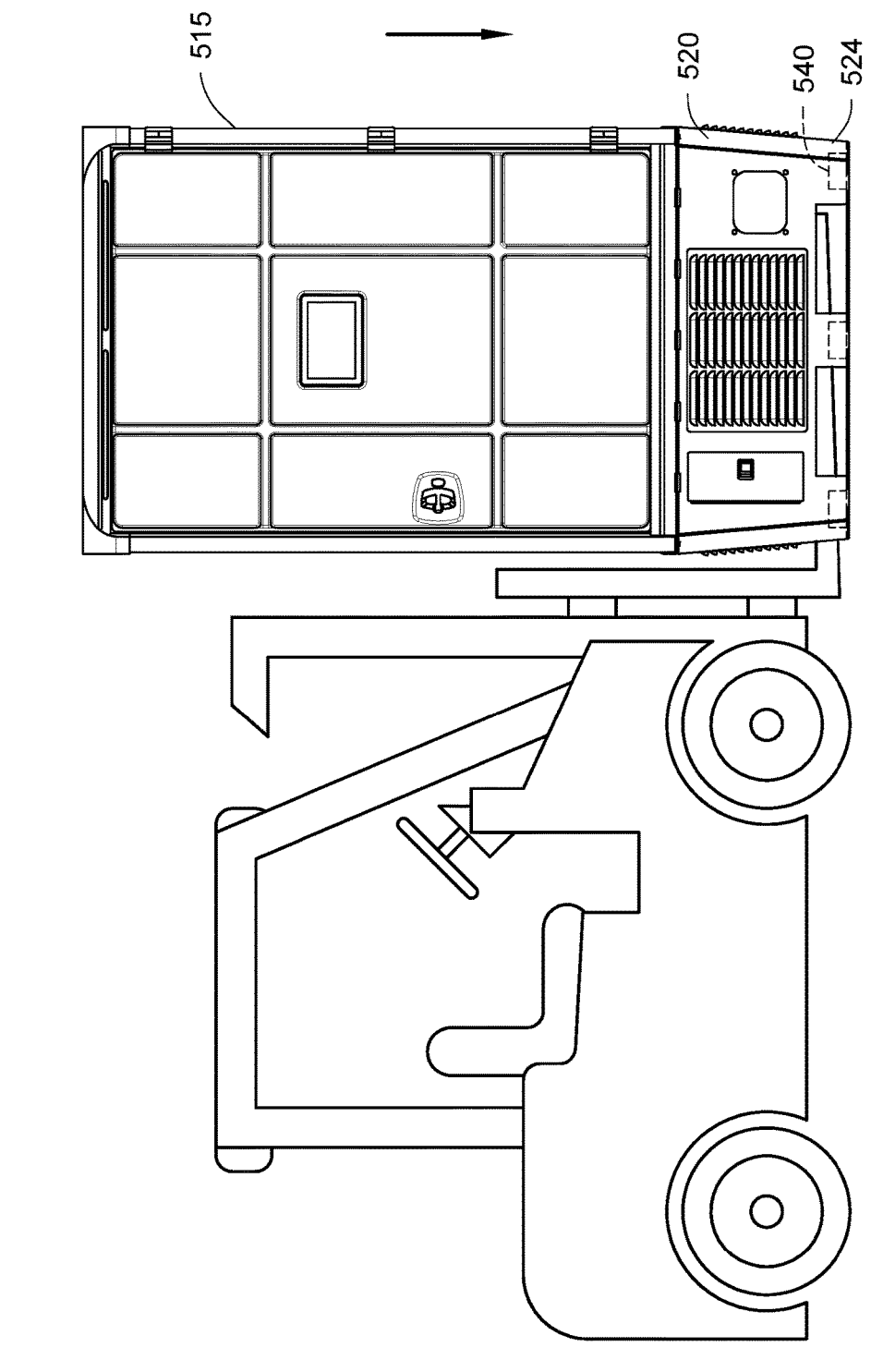
Figure 5B:
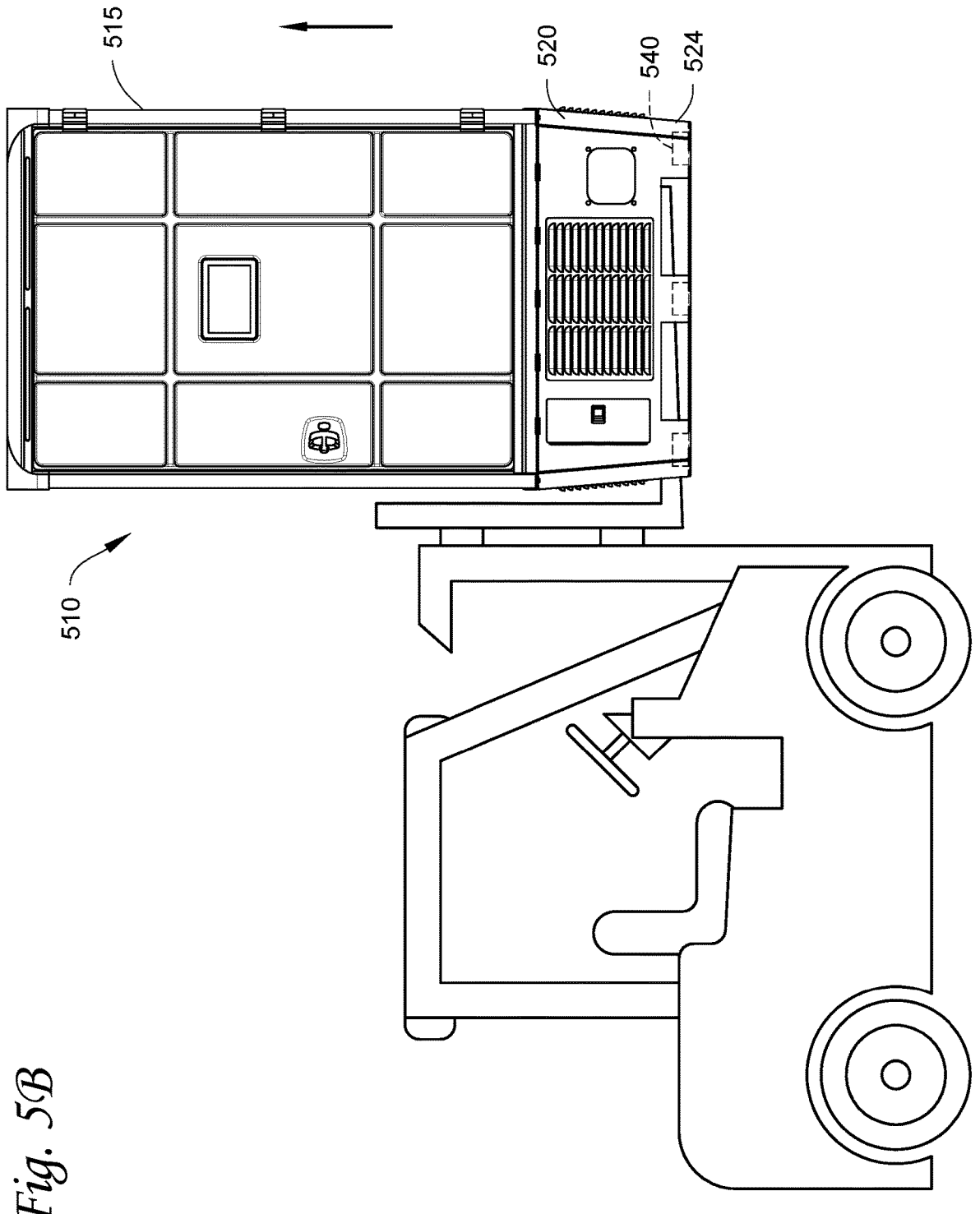

FIGS. 5A and 5B illustrate a lifting operation of a self-contained climate controlled storage unit, according to an embodiment.

Figure 6:
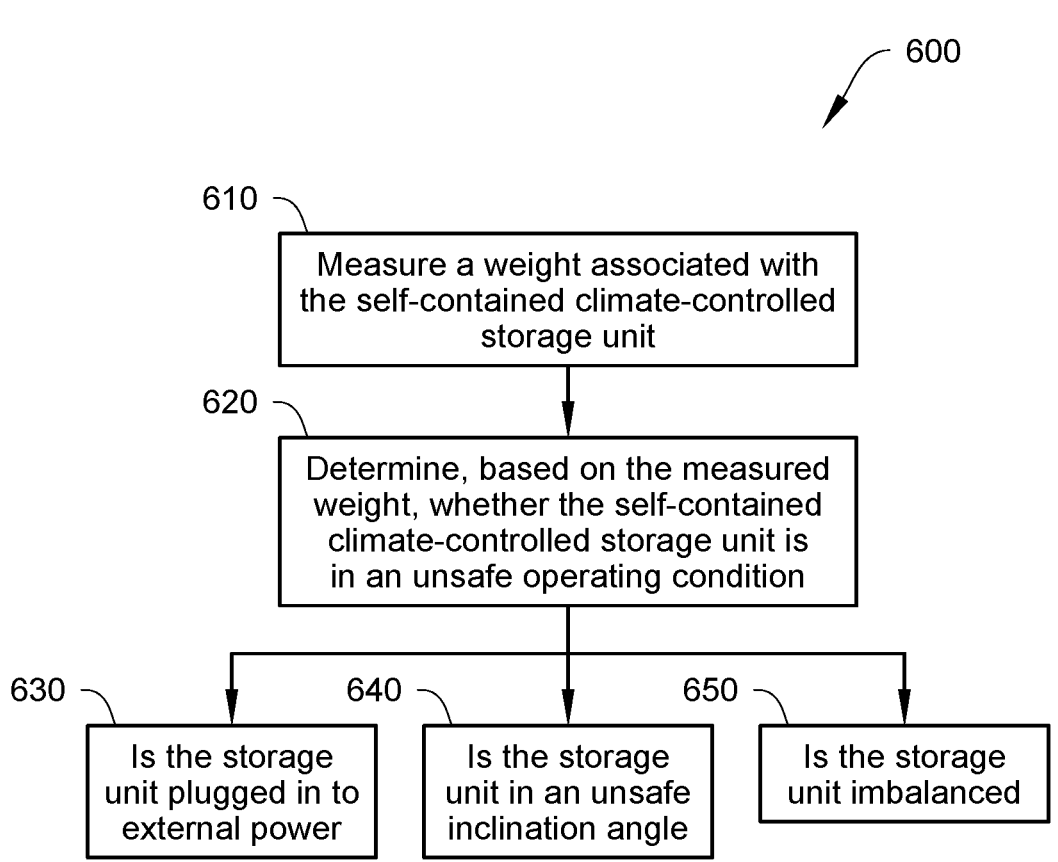

FIG. 6 is a flowchart of a method for determining an unsafe condition of the storage unit, according to an embodiment.

Like reference numbers represent like parts throughout.

DETAILED DESCRIPTION

This disclosure relates generally to a self-contained climate controlled storage unit. More particularly, the disclosure relates to a method and system for measuring a weight associated with the self-contained climate controlled storage unit.

It is noted that: U.S. application Ser. No. 29/868,048, "ELECTRICALLY POWERED PORTABLE SELF-CONTAINED CLIMATE CONTROLLED STORAGE UNIT,"; U.S. application Ser. No. 18/056,488, "METHODS AND SYSTEMS FOR POWER SHARING AND CHARGING COORDINATION OF SELF-CONTAINED CLIMATE CONTROLLED STORAGE UNIT(S),"; U.S. application Ser. No. 18/056,498, "METHODS AND SYSTEMS FOR CLEANING AN ELECTRICALLY POWERED PORTABLE SELF-CONTAINED CLIMATE CONTROLLED STORAGE UNIT,"; and U.S. application Ser. No. 18/056,502, "METHOD AND SYSTEM FOR PROVIDING AN INDICATION OF A SYSTEM OPERATING STATUS OR LOGISTICAL OPERATION STATUS OF A SELF-CONTAINED CLIMATE CONTROLLED STORAGE UNIT,"; all filed concurrently herewith on Nov. 17, 2022, and the contents of which are incorporated herein by reference.

The terms "above", "below", "top", "bottom", "left", "right", and the like described in the present application are defined according to the typical observation angle of a person skilled in the art and for the convenience of the description. These terms are not limited to specific directions but provided for ease of understanding the disclosure. As such, the terms should be interpreted broadly and can include, but not limited to, being directly adjacent, near, or spaced apart from the respective components.

A self-contained climate controlled storage unit, such as a refrigerated air freight container (e.g., Air100-RKN and AIR200-RAP from Thermo King and Envirotainer®, etc.), a portable refrigeration container (e.g., ColdCube™ container from Thermo King, Coldtainer® from Thermo King, etc.), etc., provides portable climate controlled storage for cargo (e.g., produce, frozen foods, pharmaceuticals, biologicals, for example, human tissue, blood, heart, and lung, etc.). In some instances, the cargo can be high value/critical cargo. These self-contained climate controlled storage units are typically battery powered. A self-contained climate controlled storage unit, as defined herein, is capable of autonomous operation (e.g., for a week or more) via battery power. In some embodiments, a full pallet of self-contained climate controlled storage units can be transported within a transport unit (e.g., a truck, a van, a trailer, an intermodal container, an airplane, etc.). Each of the self-contained climate controlled storage units can be recharged by plugging into an external power source, e.g., an electrical outlet to shore power or external battery or electrical generator.

The weight of the storage unit and/or the weight of the cargo inside the storage unit may need to be known for determining transportation and handling logistical requirements. For example, the weight may be needed for shipment or transport carrier restrictions, e.g., due to weight limits/restrictions for the transport unit, such as, airplanes, railways, trucks, semi-tractors, or other similar transport units, and for cargo transport/delivery, e.g., for bills of lading, handling equipment, etc. While various types of external scales can be used to measure the weight of the self-contained climate controlled storage unit and/or the cargo placed inside the self-contained climate controlled storage unit, such scales have limited functionality to self-monitor the self-contained climate controlled storage unit, especially during the transport and/or the handling of the storage unit.

The systems and methods described herein are directed to an electrically powered self-contained climate controlled storage unit that can be transported in a climate controlled or non-climate controlled transport unit, such as, airplanes, railways, trucks, vans, trailers, intermodal containers, or other similar transport units, and that can self-monitor the weight and/or orientation associated with the storage unit during transport and/or handling. The self-contained climate controlled storage unit can include at least one sensor for measuring at least a weight and/or orientation associated with the self-contained climate controlled storage unit and a system controller connected to the self-contained climate controlled storage unit. The system controller can be configured to provide an alert based on the weight and/or orientation associated with the self-contained climate controlled storage unit.

In an embodiment, the system controller can use the sensor(s) to determine a weight associated with the self-contained climate controlled storage unit, such as, cargo weight, the weight of the self-contained climate controlled storage unit, as a whole, etc., and to determine unsafe operating conditions, for example, incorrect cargo placement in the self-contained climate controlled storage unit, potential tipping hazards, damage or theft, being connected for charging, or the like. As such, the system controller can be used to provide information and/or alerts related to the storage unit and cargo stored within the storage unit for transport and/or handling and to determine whether any potentially hazardous conditions may occur during the transport and/or handling, for example, when the storage unit is being lifted or during potential tipping of the storage unit.

While some of the embodiments discussed below are discussed with respect to a freight container, one skilled in the art would recognize the embodiments discussed herein can be provided for any type of electrically powered self-contained climate controlled storage unit (e.g., air freight containers, portable refrigerated storage boxes, etc.).

Figure 1:
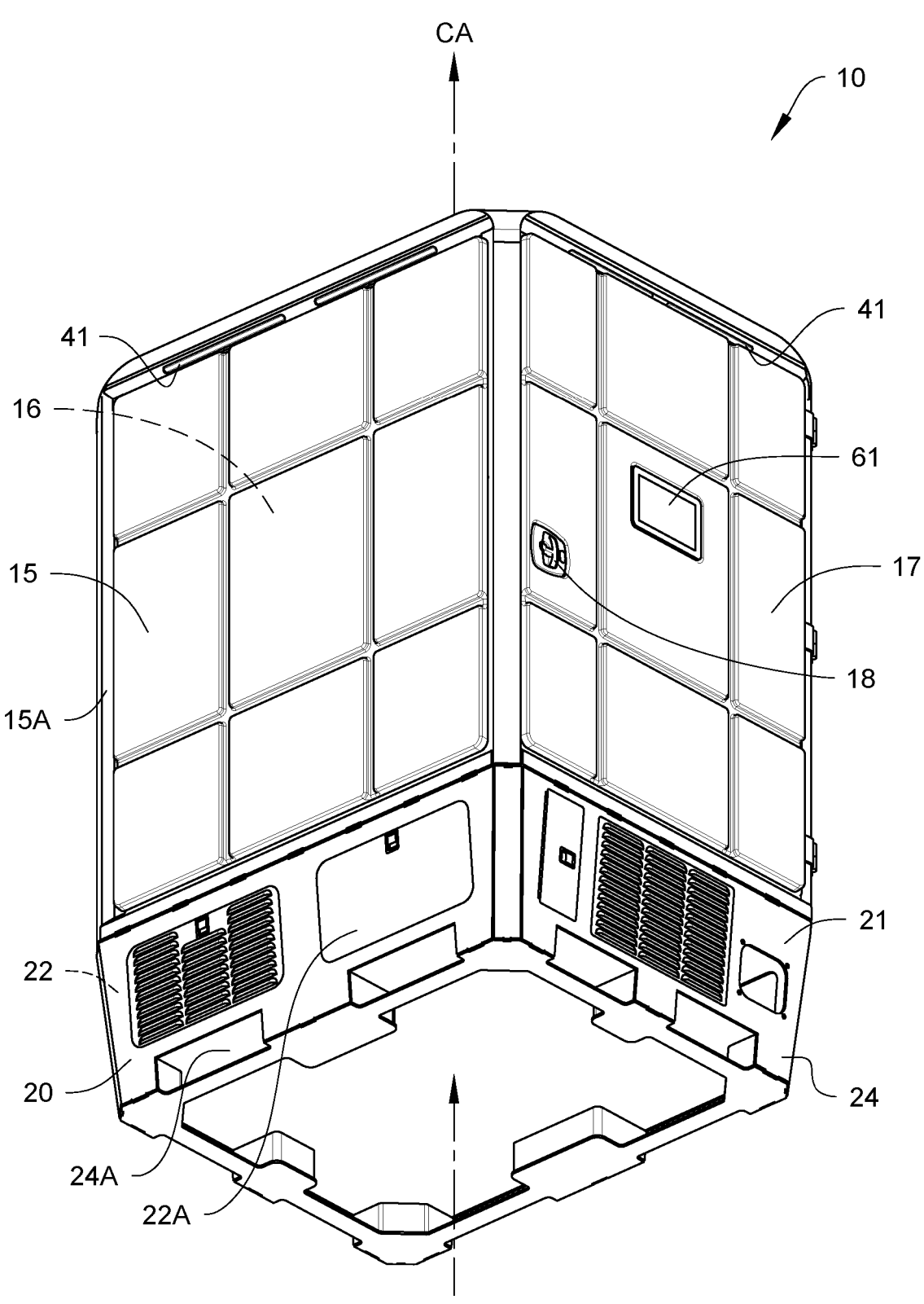
FIG. 1 illustrates a self-contained climate controlled storage unit, according to an embodiment.
Figure 2:
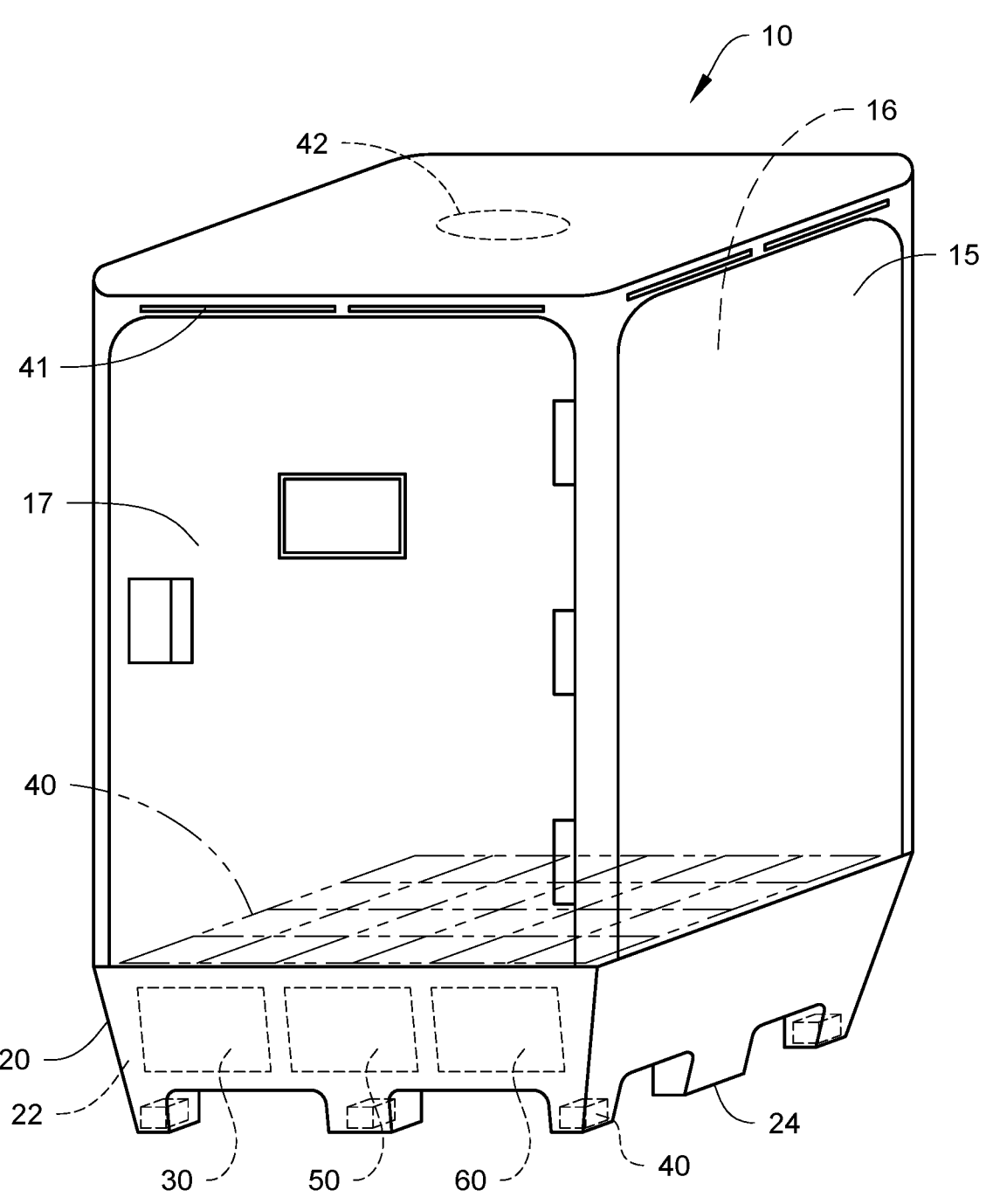
FIG. 2 is a schematic illustration of the components of a self-contained climate controlled storage unit, according to an embodiment.

FIG. 1—illustrates a self-contained climate controlled storage unit 10 and FIG. 2 is a schematic illustration to show components of the self-contained climate controlled storage unit 10, according to an embodiment. The storage unit 10 includes a climate controlled space 15 and a base 20. The climate controlled space 15 is affixed above the base 20, e.g., vertically above the base 20, either directly above or to the side of the base 20. The storage unit 10 also includes a climate control system 30 for cooling and/or heating the climate controlled space 15, at least one sensor 40 for measuring at least a weight and/or orientation associated with the storage unit 10, a status indication light 41, and a system controller 50 connected to the storage unit. As shown in FIG. 2, the storage unit 10 also includes a power source 60 for supplying power to the climate control system 30.

The climate controlled space 15 includes an insulated housing 15A having an interior space 16 for storing cargo. In the illustrated embodiment, the insulated housing 15A can include insulated side, bottom, and top walls configured to generally conform to the shape required of the storage unit 10. Access to the interior space 16 can be provided via door 17 for enclosing and/or accessing the cargo. The door 17 can be kept closed by securing mechanism 18. The securing mechanism 18 can be a handle, knob, pull handle, turn handle, or the like connected to a lock, and can be operable and accessible via keypad, biometrics, web, key card, mobile, a combination of the same, or the like.

In an embodiment, the climate controlled space 15 can have a width of about 30 inches to 60 inches, or at about 42 inches for accommodating a standard pallet in the interior space 16. The height of the climate controlled space 15 can be between 36 inches and 120 inches, or between 36 inches and 72 inches, since at larger heights, the center of gravity of the storage unit 10 may be higher and could be prone to tipping. It is understood that such disclosure is not intended to be limiting in scope, but provided for understanding the disclosure.

The base 20 includes a housing 21 having an enclosure 22 and a plurality of feet 24 for supporting the storage unit 10. In the embodiment shown in FIG. 2, the enclosure 22 include the climate control system 30 the system controller 50, and the power source 60. The enclosure 22 can be accessible via a panel or door 22A on the housing 21. In an embodiment, the plurality of feet is positioned to support the storage unit 10. The plurality of feet 24 is provided at least at the corners of the base 20 and/or at or along a center of the base 20 and/or along the edges of the base 20. Slots or openings 24A are provided between the plurality of feet 24. In some embodiments, the slots or openings 24A can have a width for accepting forks or tines of a forklift or for engaging other lifting and handling machines. In an embodiment, the plurality of feet 24 can include wheels or retractable wheels, e.g., manual, hydraulic, piston driven, or the like, to allow the moving or repositioning of the storage unit 10 without a lifting and handling machine.

The climate control system 30 can be configured to provide climate control (e.g., temperature, humidity, atmosphere, etc.) within the interior space 16. In particular, the climate control system 30 can provide climate control to maintain fresh and/or frozen cargo or provide heated storage for cargo stored within the interior space 16 via vents and/or communication channels or ducts through the walls of the storage unit 10, It will be appreciated that the particular cargo is not limiting. For example, in an embodiment, the cargo can include perishable items such as food, while in another embodiment the cargo can include pharmaceuticals, biologics, or medical equipment, blood, organs, or the like. In an embodiment, the climate control system 30 can include one or more climate control circuits (not shown). Each of the one or more climate control circuits can include, for example, a compressor, a condenser, an evaporator, and an expansion valve. In an embodiment, one or more condensers (not shown), one or more condenser fans (not shown), and one or more electrical components (e.g., valve(s)) (not shown) can be housed within the climate control system 30. There can also be one or more evaporators (not shown) and one or more evaporator fans (not shown) housed within one or both of the climate control system 30 and the interior space 16 to provide climate control within the interior space 16.

The system controller 50 can be configured to control and communicate with the storage unit 10, one or more electrical components, the at least one sensor 40, and/or the climate control system 30, e.g., the compressor, the one or more condenser, and/or evaporator fans, etc. The system controller 50 can include a processor and memory for storing data and instructions. In an embodiment, the system controller 50 can be connected to a human machine interface (HMI) 61 that can be powered by the power source (e.g., as discussed below as power source 60). The HMI 61 can include a display, touchscreen, keypad, or the like as an interface for controlling or programming of the storage unit 10, displaying information related to the storage unit 10, or the like. In an embodiment, the information can include shipment details, weight, cargo, battery power, alert/alarm conditions, temperature, humidity, max and min temperatures, or the like. In an embodiment, the HMI is integrated with the securing mechanism 18 which has a display for displaying such information.

The power source 60 can be configured to power the storage unit 10, the system controller 50, and/or the climate control system 30. The power source 60 can include a battery source (not shown), e.g., battery powered. The battery source can be supplied with an energy supply source when the self-contained climate controlled storage units are in the climate controlled transport unit or can be supplied with energy (i.e., charged/recharged) prior to being loaded and transported in a transport unit. The battery source can be configured to provide electrical energy to, for example, the system controller 50, the one or more electrical components, the compressor, the one or more condenser and/or evaporator fans, etc.

The battery source can include one or more battery banks (not shown) with a DC and/or AC charge input (not shown) configured to allow an external power source to charge the one or more battery banks. When charge input includes a DC charge input, the battery source can also include a DC charge controller, a DC isolation connection, and a DC disconnect switch. When the charge input includes an AC charge input, the battery source can also include an AC inverter, an AC charger, and an AC disconnect switch and a breaker panel.

It is appreciated that, in an embodiment, the storage unit 10 can be configured such that a center of mass of the storage unit 10 is located along a central axis CA of the base 20. That is, the system components, e.g., batteries, compressor, evaporator, etc., which have a weight associated therewith, are arranged in the base 20 so that the center of mass of the storage unit 10 is located centrally, to provide a stable base for the storage unit 10. It is appreciated that the center of mass can be based on the total weight of the storage unit 10 and system components before the cargo is loaded into the storage unit. For example, since the center of mass can be based on the total weight of the storage unit 10, with most of the weight being provided by the base 20, the center of mass can be located several inches, e.g., between 6 inches and 20 inches, above the base 20 along the central axis CA.

As shown in FIG. 2, the at least one sensor 40 can be provided for measuring a weight and/or orientation associated with the storage unit 10. The sensor(s) 40 can be a pressure sensor or a load sensor or cell. The sensor(s) 40 can be provided in one or each of the plurality of feet 24 of the base 20. In another embodiment, the sensor(s) 40 can be provided between the climate controlled space 15 and the base 20 (shown as broken lines) to measure the weight of the cargo. In another embodiment, the storage unit 10 can include a plurality of sensors 40 provided at different locations or a combination of locations on the storage unit 10. For example, the sensors can be provided on the plurality of feet 24 and in the slots or openings 24A to determine whether the storage unit 10 is being lifted. It is appreciated that the disclosure of the placement of the sensor is not intended to be limiting, but rather provided to discuss some of the combinations of sensor arrangements on the storage unit 10 to provide different data for analysis and/or processing by the system controller, as further discussed below. For example, the sensor(s) 40 can be provided between the plurality of feet 24 and the base 20 or other locations along the feet or base to detect a weight associated with the storage unit 10.

A second sensor 42 can be provided for measuring another condition of the storage unit 10. In an embodiment, the second sensor 42 can be an accelerometer or inertial monitor for measuring an acceleration associated with the storage unit 10 and/or an inclinometer for measuring an inclination of the storage unit 10 and/or a second weight sensor, such as, a load cell force/weight sensor for measuring a force or weight pressing down on top of the storage unit 10. For example, in an embodiment, the second weight sensor can be used in conjunction with the sensor 40 to calculate a load on top of the storage unit 10. In another embodiment, the second sensor 42 can include a temperature sensor, humidity sensor, or the like for monitoring the environmental conditions of the interior space 16 of the storage unit 10.

In view of such various arrangements of the sensor(s) 40 on the storage unit 10, the sensor can be used to measure and/or determine various conditions of the storage unit 10. In an embodiment, the sensor(s) 40 can be used to measure the entire weight of the storage unit 10, the weight of the cargo product, the weight of various components of the storage unit 10, or the like. For example, the sensor 40 can be used to provide accurate and/or real-time weight information, including, but not limited to, self-calibration of tare weight which eliminates a separate weighing process, indication of whether the storage unit was ever double or triple stacked which could damage a storage unit, weight information of the cargo to verify with the shipment documentation and to support the ability for the carrier of the transport unit to accurately charge customers based on the tare or gross weight and verify against the bill of lading, which can be displayed on the storage unit or sent via telematics, a total weight of the storage unit, e.g., including cargo, so that proper handling equipment can be used for loading and unloading, or the like. For example, in an embodiment, the storage unit 10 can include a factory programmed calibration factor, in which a frame weight, battery weight, and/or weight of other components are set prior to deployment or use of the storage unit 10. As such, such calibration factors can be used to determine the tare weight(s), damage or theft of components, and/or if there is an error in the sensor(s) 40. It is understood that the term telematics can be generally related to monitoring the storage unit using GPS technology or the like to track movement and/or providing communications with the user or customer via the Internet, cellular, or the like related to the shipping and/or handling of the storage unit and can include a GPS module, RF transceivers, USB interface, WiFi communications module, cellular communications modules, or other Internet accessible and communication modules.

The sensor(s) 40 can also be used to determine various conditions associated with the storage unit 10, for example, operating condition, improper load balancing, potential tipping, theft or damage to various components, or the like. As such, the system controller 50 can be used to alert the user or customer when certain conditions are determined, e.g., theft, tipping, or the like, based on the measured weight(s). For example, the sensor(s) 40 can be used to determine whether an unstable weight balance exists in the storage unit so that potential load imbalances can be corrected, e.g., if the center of mass of the storage unit and/or cargo is too high, a potential tipping hazard exists during transport and/or handling, and/or the operation status of the storage unit 10, e.g., the measured value from the sensor(s) 40 can be used to change a mode of operation based on the weight. In an embodiment, if no weight is detected in the climate controlled space 15, the system controller 50 can instruct the climate control system 30 to automatically shut off. In another embodiment, if no weight is detected in the climate controlled space 15, a run condition can be executed, for example, internal UV sterilization. It is appreciated that the alert can be from the status indication light 41 on the storage unit 10 that flashes red and/or an audible alarm and/or an alert from the HMI 61 and/or a communication sent via the Internet, cellular, or the like.

In another embodiment, the sensor(s) 40 can be used to determine whether any of the components of the storage unit 10, e.g., system controller 50, batteries of the power source 60, compressor of the climate control system 30, or the like, have been removed or are damaged based on a minimum threshold tare weight of the storage unit 10, e.g., the total weight is below a minimum weight. In an embodiment, the sensor(s) 40 can also be used to determine whether a sensor or equipment is damaged, for example, if the sensor reads zero or outputs an error signal.

In an embodiment, the sensor(s) 40 can be used in conjunction with the second sensor 42 to provide sensor fusion, e.g., increased information based on the two sensor information. For example, the second sensor 42 can be an accelerometer, such that based on the sensor(s) 40 detecting a weight imbalance and the accelerometer 42 detecting a rapid acceleration of the storage unit 10, the system controller 50 can determine that the cargo inside the climate controlled space 15 has likely been damaged, e.g., due to the storage unit 10 being tipped over or cargo being tipped over. In another embodiment, the second sensor 42 and/or sensor (s) 40 can be used to determine whether the storage unit 10 is provided at an unstable or an unsafe position which could be detrimental to the operation of the storage unit 10. As such, the system controller 50 can alert and/or shut-off certain components of the storage unit 10 to prevent or reduce damage, e.g., shutting of the climate control system 30.

The status indication light 41 can be provided to provide alerts or status indication of the storage unit 10. The status indication light 41 can include a plurality of LEDs that can operate in varying colors of operation. As such, the status indication light 41 can be used to provide alerts to the user or customer when certain conditions are determined, e.g., theft, tipping, or the like, based on the measured weight(s) or other alarming conditions, e.g., potential errors.

Figure 3A:
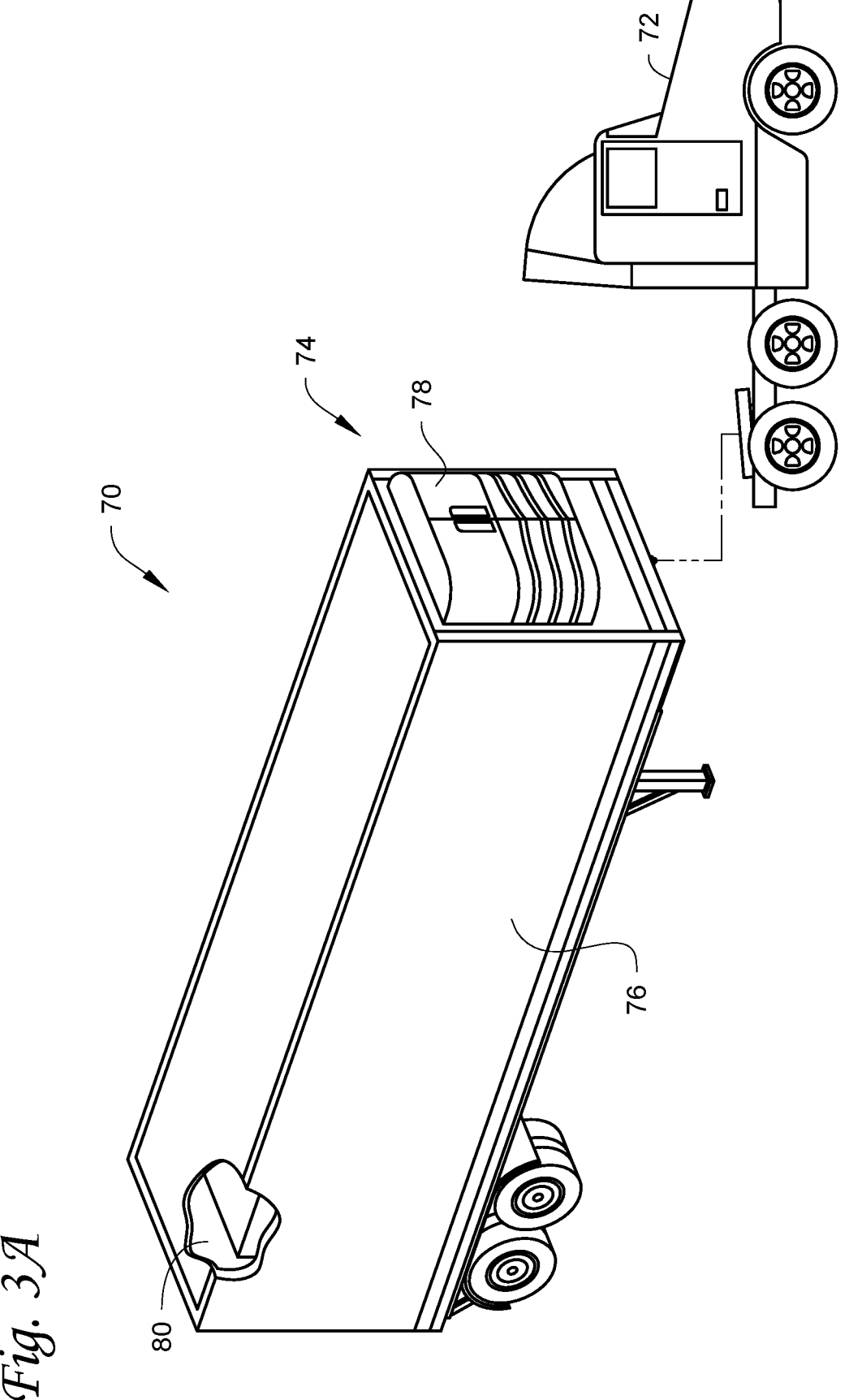
FIGS. 3A-3B illustrate a climate controlled transport unit having a trailer attached to a tractor, the trailer storing the self-contained climate controlled storage unit of FIGS. 1 and 2, according to an embodiment.
Figure 3B:
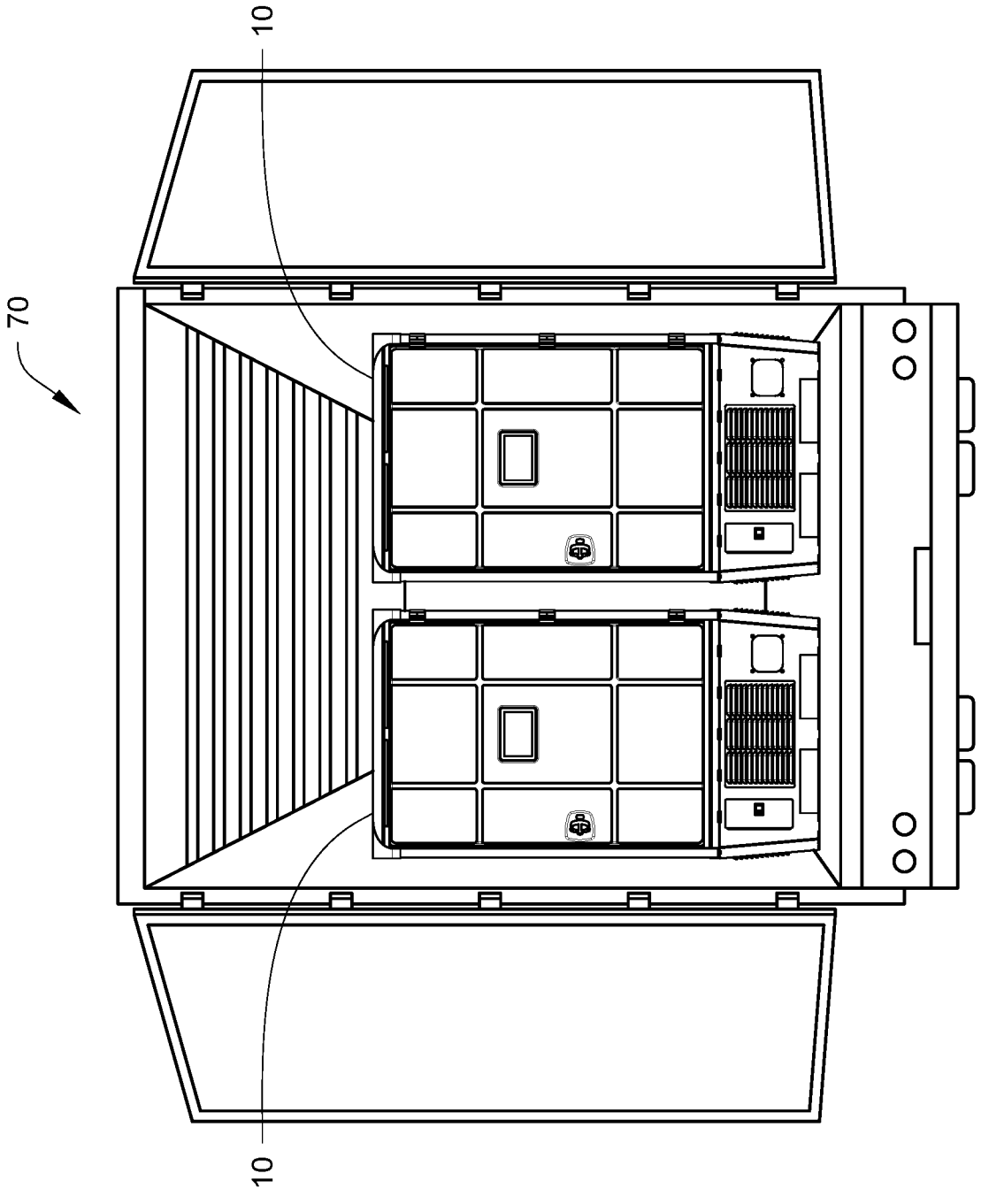

FIGS. 3A and 3B illustrate a transport unit 70 attached to a tractor 72, according to an embodiment. The transport unit 70 includes a transport climate control system (TCS) 74 and a transport unit 76. The TCS 74 can be configured to control a climate (e.g., temperature, humidity, atmosphere, etc.) of an internal space 80 of the transport unit 76. In particular, the TCS 74 can be configured to transfer heat between an internal space 80 and the outside environment. In some embodiments, the TCS 74 can be a multi-zone system in which different zones or areas of the internal space 80 are controlled to meet different climate control requirements based on the cargo stored in the particular zone. The TCS 74 can include a transport climate control unit (TCU) 78 for providing climate control within the internal space 80. The internal space 80 can store cargo including, for example, one or more self-contained climate controlled storage units 10. It is appreciated that while the transport unit 70 has been discussed as having the TCS 74, the disclosure is not intended to limit the scope. In an embodiment, the transport unit 70 can be a non-climate controlled transport unit 70. As such, the storage units 10 can provide the necessary climate control for individual cargo stored therein.

As seen in FIG. 3B, the storage units 10 can be placed and secured in the transport unit 70. It is appreciated that due to the dimensions of the storage unit 10, the storage units 10 can be placed side by side and front to back in the transport unit for compact packing and transport of the storage units 10. As such, the storage unit 10 can individually provide the climate control requirements for the cargo stored in each individual storage unit 10 based on the customer's needs. It is appreciated that in an embodiment, a mesh network can be created between the storage units 10 that are loaded in the transport unit or provided in a warehouse or the like that are grouped together, e.g., based on the bill of lading, delivery address, proximity, or the like. For example, the storage units 10 can include telematics or proximity sensors, e.g., RF sensors, to group the storage units 10 together, such that the storage units 10 in the mesh network can communicate with a main controller to aggregate any of the necessary information, e.g., cargo weight, total weight, or the like. Such information can be communicated to a logistics operator to communicate the total trailer load data, the container weights, and/or loading status for the control of the transport and delivery of the storage units.

It is appreciated that the mesh network can also use the self-weighing storage units 10 to provide loading instructions for the transport unit 70. For example, since the storage units know their individual weights and the mesh network provides all of the weights of the storage units 10 in the mesh network, the main controller can be used to determine the loading strategy of the storage units 10 in which the heaviest storage units 10, e.g., the storage units that are full, can be loaded at the front of the transport unit for the proper distribution of weight in the transport unit 70. Such indication can be provided by status lights or the like to indicate the order in which the storage units 10 should be loaded in the transport unit 70.

Embodiments of systems and methods for self-weighing of the self-contained climate controlled storage unit, such as the storage unit 10, are described in additional detail below.

Figure 4:
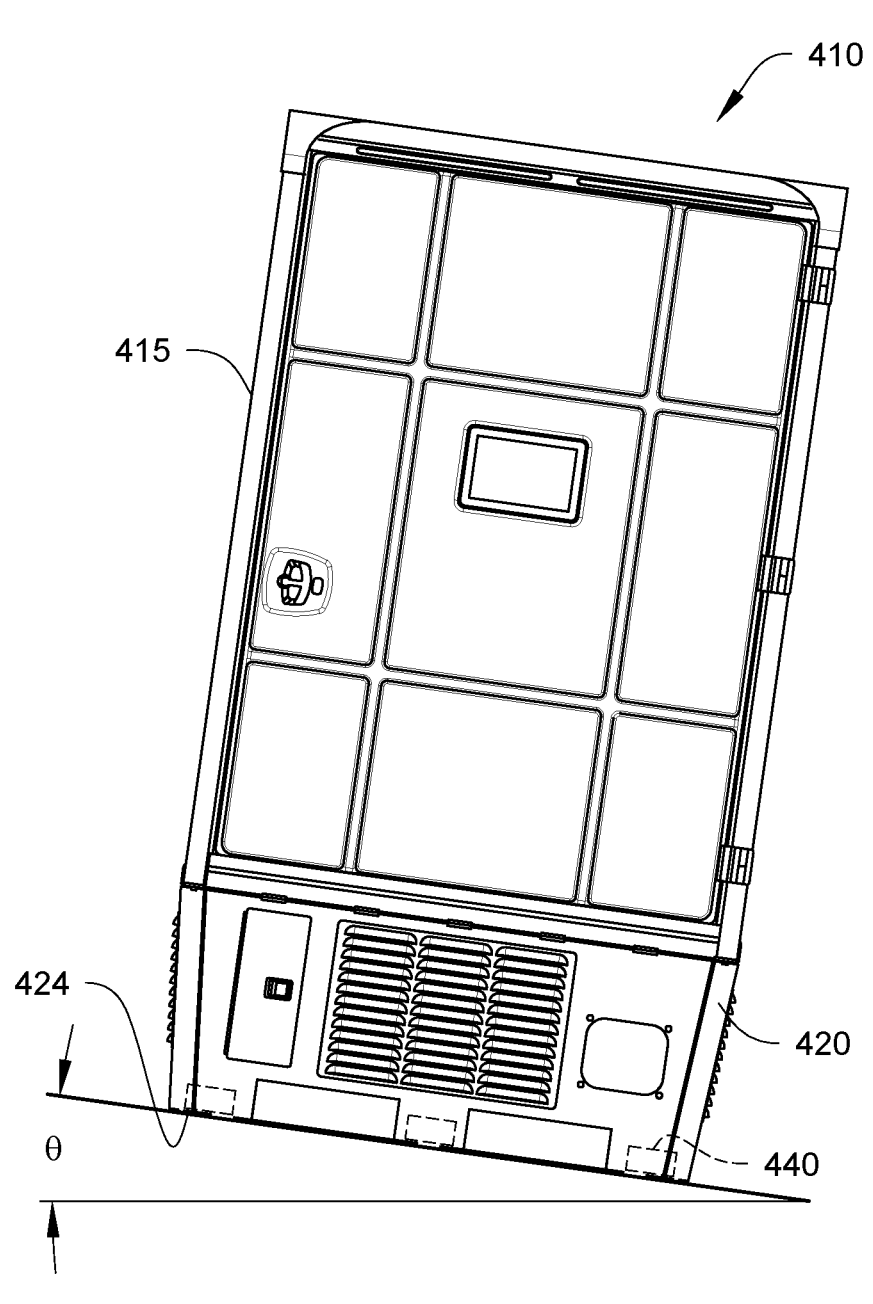
FIG. 4 illustrates operation of a self-contained climate controlled storage unit, according to an embodiment.

FIG. 4 illustrates a self-contained climate controlled storage unit 4/0, according to an embodiment. The storage unit 410 includes a climate controlled space 415 and a base 420. The climate controlled space 415 can be affixed above the base 420, e.g., vertically above the base 420. The storage unit 410 can also include a climate control system (e.g., climate control system shown in FIG. 2) for cooling and; or heating the climate controlled space 415, at least one sensor 440 for measuring at least a weight associated with the storage unit 410, and a system controller (e.g., system controller 50 shown in FIG. 2) connected to the storage unit 410. In an embodiment, the storage unit 410 can also include a power source (e.g., power source 60 shown in FIG. 2) for supplying power to the climate control system. In an embodiment, the sensor(s) 440 are provided in one or more of the plurality of feet 424, e.g., in each corner foot and/or in the foot between the corner feet. As such, the sensor(s) 440 can be used to determine a total weight of the storage unit 410 and/or the weight of the cargo in the climate controlled space 415 based on the tare weight of the storage unit 410.

Since weight is a vector quantity, e.g., has both direction and magnitude, the sensor 440 can be used to not only determine a weight associated with the storage unit 410, but also determine various conditions of the storage unit 410. For example, when a weight changes, e.g., due to shifting cargo or due to a tipping of the storage unit, the system controller (e.g., 50 shown in FIG. 2) can be used to provide an alert based on an increased measured weight at one or more of the sensor(s) 440, e.g., increased weight per area, and/or loss of weight at one or more of the sensor(s) 440 such that the system controller (e.g., system controller 50 shown in FIG. 2) can take an appropriate action, e.g., shut down of the climate control system (e.g., climate control system 30 shown in FIG. 2) or provide an alert or notification to the shipper and/or customer.

In an embodiment, the system controller (e.g., system controller 50 shown in FIG. 2) and the sensor(s) 440 can be used to determine whether the storage unit 410 is in an unstable position, e.g., the storage unit is inclined in which one side is tipped higher than another side. For example, the system controller and sensor(s) 440 can be used to determine whether the storage unit 410 is positioned at an inclination angle θ greater than a predetermined angle, e.g., a safe operating angle. In an embodiment, as seen in FIG. 4, the sensor(s) 440 positioned closer to a horizontal plane can bear more weight than the sensor(s) 440 farther from the horizontal plane. The system controller can then, based on the weight measured by the sensor(s) 440, including the added weight measured by the sensor closest to the horizontal plane and the less weight measured by the sensor farthest from the horizontal plane, determine the inclination angle of the storage unit 410. When the inclination angle θ of the storage unit exceeds a predetermined value, e.g., an angle higher than 10 degrees, or higher than 15 degrees, or higher than 30 degrees, the system controller (e.g., system controller 50 shown in FIG. 2) can provide an alert indicating that the storage unit 410 is in an unstable position that would be detrimental to the operation of the storage unit 410. As such, the system controller can then take any appropriate automatic action, such as, automatically shutting off the climate control system to avoid damage to the climate control system and/or providing audible and/or visual alerts indicating a potential hazardous condition. For example, the climate control system can contain a climate control circuit that is reliant upon being at a certain orientation for the flow of refrigerant to safely and effectively operate. If a certain tipping angle is surpassed, refrigerant could amass in dense liquid form in areas that could cause extensive damage to the refrigeration circuit. Preventing operation while in a state of excess angle positioning will prevent or mitigate damage to the climate controlled system and subsequent repair. It is appreciated that in an embodiment, the system controller can control the retraction/extension of the wheels in the plurality of feet 24 to adjust the inclination angle to a stable position.

In another embodiment, the system controller of the storage unit 410 can monitor the sensor(s) 440, e.g., based on the weight distribution of the storage unit 410, and/or an angle tipping sensor, e.g., pendulum-based, gas-based, electrolytic-based, or liquid-based inclinometers, to determine a baseline or "upright" storage angle. The system controller can constantly monitor the angle using the sensor(s) 440 and/or the tipping sensor, during all states of non-operation and operation of the storage unit 410. If at any time the system controller determines that the angle of the storage unit 410 is out of a pre-determined angle that is detrimental to the climate control system operation, the system controller can automatically shut of the climate control system. Once a storage unit 410 tipping angle is determined to be back in-line within acceptable limits, a pre-determined waiting period, e.g., one minute, five minutes, ten minutes, or the like, can be activated that will allow for refrigerant to flow to safe operational levels before the refrigeration system is reactivated.

In another embodiment, the sensor(s) 440 can be used to provide an alert when an imbalance of the weight distribution of the cargo in the climate controlled space is detected. For example, if during the loading of the storage unit 410, the cargo is not loaded on the pallet to have proper weight balancing, e.g., distribution, the system controller can determine whether such cargo would make the storage unit 410 unstable during transport and/or handling, e.g., the system controller can initially determine that the center of mass of the storage unit is located along a central axis of the base using the sensor(s) 440. Once the pallet with the cargo is loaded in the storage unit 410, the system controller can use the sensor(s) 440 to weigh the cargo and determine any movement or shift of the center of mass of the storage unit. If the storage unit determines that the center of mass or weight distribution has shifted beyond a predetermined value, e.g., a shift in the distance of the center of mass with respect to the central axis, the system controller can be used to provide an alert to the user or customer to re-arrange, redistribute, or shift the cargo in the climate controlled space of the storage unit 410. As such, unsafe operation of the storage unit 410 can be avoided, e.g., a tipping of the storage unit 410 during transport and/or handling.

FIGS. 5A and 5B illustrate a self-contained climate controlled storage unit 510, according to an embodiment. The storage unit 510 includes a climate controlled space 515 and a base 520. The climate controlled space 515 can be affixed above the base 520, e.g., directly vertically above the base 520. The storage unit 510 can also include a climate control system (e.g., climate control system 30 shown in FIG. 2) for cooling and/or heating the climate controlled space 515 at least one sensor 540 for measuring at least a weight and/or orientation associated with the storage unit 510, and a system controller (e.g., system controller 50 shown in FIG. 2) connected to the storage unit. In an embodiment, the storage unit 510 can also include a power source (e.g., power source 60 shown in FIG. 2) for supplying power to the climate control system. In an embodiment, the sensor(s) 540 can be provided in one or more of the plurality of feet 524, e.g., in each corner foot and/or in the foot between the corner feet. As such, the sensor(s) 540 can be used to determine a weight associated with the storage unit 510. As discussed above, since weight is a vector quantity, the system controller (e.g., system controller 50 shown in FIG. 2) can use the sensor(s) 540 to determine whether the storage unit 510 is being lifted for handling, e.g., loading or unloading.

In an embodiment, as shown in FIG. 5A, after the tines of the forklift are positioned in the slots or openings in the plurality of feet 524 and the forklift begins lifting the storage unit 510, the system controller can determine based on the sensor(s) 540 that due to the direction and/or magnitude of the weight decreasing, the storage unit 510 is being lifted. As illustrated in FIG. 5B, when the storage unit 510 is fully lifted, the system controller can determine that since no weight is being sensed by the sensor(s) 540, the storage unit 510 is not being supported by the plurality of feet 524 and thus, is lifted from a lower position, e.g., from the ground or transport unit.

Since the system controller can determine when and if the storage unit 510 is being lifted, the system controller can provide any necessary alerts and/or actions based on the operating condition of the storage unit 510, e.g., due to unsafe operating conditions. For example, when the storage unit 510 is being charged, e.g., the power source is plugged in for charging the batteries from an external power source, e.g., shore power or power from the transport unit, and the system controller determines that the storage unit 510 is being lifted, the system controller can shut off the power supply and/or provide an alert that the storage unit 510 is still connected and must be disconnected before further handling, e.g., a top status bar on the storage unit 510 flashes red and/or an audible alarm is provided, to prevent or mitigate damages to the system components, e.g., prevent unsafe decoupling of the power source.

In another embodiment, sensor(s) 540 can be provided in the slots or openings between the plurality of feet 524, such that when the sensor(s) 540 are contacted by a forklift or the like, and a weight is measured by the sensor(s) 540, the system controller can determine that the storage unit 510 is being lifted. In yet another embodiment, the sensor(s) 540 is provided between the climate controlled space 515 and the base 520. As such, when the sensor(s) 540 is a load cell and the sensor(s) 540 senses that a force is being applied on the opposite side of the normal sensing direction of the sensor(s) 540, e.g., from the downward or lower direction, the system controller can determine that the storage unit 510 is in a lifted state.

While the system controller and sensor(s) are described above with respect to specific embodiments, it is understood that such disclosure is not intended to be limiting in scope, but provided to provide examples of the disclosure. Not only can the above described embodiments be combined to provide a robust self-weighing system, the system controller and sensor(s) can be used to determine other conditions of the storage unit. As such, the storage unit is self-aware of its operating condition.

In an embodiment, when the storage unit includes sensor(s) at the plurality of feet and the system controller can determine the weight of the storage unit. As such, if the weight of the storage unit decreases, e.g., due to the removal of a system component, e.g., compressor, batteries, or the like, the system controller can determine that a theft has occurred. The system controller can then send an alert to the customer or user and/or provide a necessary action, e.g., shutting down the climate control system.

In another embodiment, the storage unit can include sensors at the plurality of feet or between the base and the climate controlled space. As such, when the system controller determines that the storage unit does not have any cargo positioned in the climate controlled space, the system controller can shut off the climate control system to conserve power of the power source.

FIG. 6 is a flowchart of a method 600 for determining whether an unsafe condition exists for the electrically powered portable self-contained climate controlled storage unit, according to an embodiment. The method 600 generally can be performed to selectively provide an alert or take an appropriate action to prevent or mitigate damage to the storage unit or components thereof. In an embodiment, the self-contained climate controlled storage unit can include a base including an enclosure and at least one foot for supporting the self-contained climate controlled storage unit, a climate controlled space affixed above the base, and a climate control system for proving climate control to the climate controlled space that is provided in the enclosure. The storage unit can further include a power source for supplying power to the climate control system, the power source provided in the enclosure of the base. In an embodiment, the storage unit is a self-contained climate controlled storage unit (e.g., the storage units 10, 410, 510 in FIGS. 1-5B).

At 610, a system controller (e.g., a system controller 50 of the storage unit 10 in FIG. 2) monitors a weight/orientation associated with the storage unit using at least one sensor (e.g., 40, 440, 540 in FIGS. 1-5B). The sensor can be the at least one sensor(s) 40, 42 of FIG. 2 for monitoring a weight and/or orientation associated with the storage unit 10. The sensor(s) 40, 42 can be a pressure sensor or a load sensor or cell. The sensor(s) 40, 42 can be provided in at least one of the plurality of feet 24 of the base 20. In another embodiment, the sensor(s) 40, 42 can be provided between the climate controlled space 15 and the base 20 to measure the weight of the cargo. In another embodiment, the storage unit 10 can include a plurality of sensors 40 provided at different locations or a combination of locations on the storage unit 10. For example, the sensors 40 can be provided on the plurality of feet 24 and in the slots or openings 24A to determine whether the storage unit 10 is being lifted.

The at least one sensor(s) 40, 42 can also monitor another condition of the storage unit 10. In an embodiment, the second sensor 42 can be an accelerometer or inertial monitor for measuring an acceleration associated with the storage unit 10 and/or an inclinometer for measuring an inclination of the storage unit 10. In another embodiment, the second sensor 42 can include a temperature sensor, humidity sensor, or the like for monitoring the environmental conditions of the interior space 16 of the storage unit 10.

As such, the measuring of the weight at 610 can be based on a variety of different weight measurement values. Examples of weight measurements include, but are not limited to, the entire weight of the storage unit 10, the weight of the cargo product, the weight of various components of the storage unit 10, or the like. For example, the sensor can be used to provide accurate and/or real-time weight information, including, but not limited to, self-calibration of tare weight which eliminates a separate weighing process, indication of whether the storage unit was ever double or triple stacked which could damage a storage unit, weight information of the cargo to verify with the shipment documentation and to support the ability for the carrier of the transport unit to accurately charge customers based on the tare or gross weight and verify against the bill of lading, which can be displayed on the storage unit or sent via telematics, a total weight of the storage unit, e.g., including cargo, so that proper handling equipment can be used for loading and unloading, or the like.

At 620, based on the monitored weight/orientation, the system controller can determine whether the climate controlled storage unit is in an unsafe operating condition, for example, improper load balancing, potential tipping, theft or damage to various components, or the like. As such, the system controller can be used to alert the user or customer when certain conditions are determined, e.g., theft, tipping, or the like, based on the measured weight(s). For example, the sensor(s) 40, 42 can be used to determine whether an unstable weight balance exists in the storage unit so that potential load imbalances can be corrected, e.g., if the center of mass of the storage unit and/or cargo is too high, a potential tipping hazard exists during transport and/or handling, and/or the operation status of the storage unit 10. In an embodiment, if no weight is detected in the climate controlled space, the system controller can instruct the climate control system to automatically shut off.

If an unsafe operating condition is identified, the system controller can take the appropriate action as required, e.g., the system control can adjust operation and/or orientation of the self-contained climate controlled storage unit.

If at 630, the system controller determines that the storage unit has its power source plugged in for charging to an external power source and determines that the storage unit is being lifted based on the measured weight, the system controller can shut down or turn off charging of the power source, e.g., batteries.

If at 640, the system controller determines that the storage unit is at an unsafe or unstable inclination angle, the system controller can automatically shut off the climate control system to avoid damage to the climate control system and/or providing audible and/or visual alerts indicating a potential hazardous condition. For example, the climate control system can contain a refrigeration circuit that is reliant upon being at a certain orientation for the flow of refrigerant to safely and effectively operate. If a certain tipping angle is surpassed, refrigerant could amass in dense liquid form in areas that could cause extensive damage to the refrigeration circuit. Preventing operation while in a state of excess angle positioning will prevent or mitigate damage to the climate controlled system and subsequent repair. It is appreciated that in an embodiment, the system controller can control the retraction/extension of the wheels in the plurality of feet to adjust the inclination angle to a stable position.

If at 650, the system controller determines that the cargo in the climate controlled space is improperly loaded, e.g., load imbalance, and/or the center of mass of the storage unit has shifted or changed leading to an unsafe operating condition, the system controller can provide a visual or audio alert, or send an alert to the customer or user to redistribute the cargo to avoid potential tipping during the transport and/or loading of the storage unit.

In an embodiment, the measuring of the weight associated with the storage unit can be performed continuously and the method 600 can be performed again by the controller. That is, the method 600 can return to 610.

Aspects:

It is to be appreciated that any one of aspects 1-15 can be combined together and/or with aspect 16.

Aspect 1. An electrically powered portable self-contained climate controlled storage unit, comprising:

a base comprising an enclosure and at least one foot for supporting the self-contained climate controlled storage unit;

a climate controlled space affixed above the base;

a climate control system for providing climate control to the climate controlled space, the climate control system provided in the enclosure;

at least one sensor for monitoring a weight and/or orientation associated with the self-contained climate controlled storage unit; and a system controller connected to the self-contained climate controlled storage unit, wherein the system controller is configured to determine an unsafe operating condition of the self-contained climate controlled storage unit based on the weight and/or orientation associated with the self-contained climate controlled storage unit monitored by the sensor.

Aspect 2. The electrically powered portable self-contained climate controlled storage unit according to Aspect 1, further comprising an accelerometer, wherein the at least one sensor monitors the weight and the accelerometer monitors an acceleration of the self-contained climate controlled storage unit.

Aspect 3. The electrically powered portable self-contained climate controlled storage unit according to any of Aspects 1 or 2, wherein the at least one sensor monitors the weight of cargo product in the climate controlled space.

Aspect 4. The electrically powered portable self-contained climate controlled storage unit according to any of Aspects 1-3, wherein the sensor is a pressure sensor or a load sensor or cell.

Aspect 5. The electrically powered portable self-contained climate controlled storage unit according to any of Aspects 1-4, further comprising a power source for supplying power to the climate control system, the power source provided in the enclosure of the base.

Aspect 6. The electrically powered portable self-contained climate controlled storage unit according to Aspect 5, wherein the power source includes one or more batteries.

Aspect 7. The electrically powered portable self-contained climate controlled storage unit according to any of Aspects 1-6, wherein the climate controlled space includes a door for opening and closing an interior space in the climate controlled space.

Aspect 8. The electrically powered portable self-contained climate controlled storage unit according to any of Aspects 1-7, wherein the base comprises a plurality of feet for supporting the self-contained climate controlled storage unit.

Aspect 9. The electrically powered portable self-contained climate controlled storage unit according to Aspect 8, wherein the sensor is a load cell or sensor that is provided in at least one of the plurality of feet of the base.

Aspect 10. The electrically powered portable self-contained climate controlled storage unit according to any of Aspects 1-9, wherein the sensor is a load cell provided between the base and the climate controlled space.

Aspect 11. The electrically powered portable self-contained climate controlled storage unit according to any of Aspects 1-10, wherein the self-contained climate controlled storage unit is configured such that a center of mass of the self-contained climate controlled storage unit is located along a central axis of the base.

Aspect 12. The electrically powered portable self-contained climate controlled storage unit according to Aspect 5, wherein the system controller is configured to determine whether the power source is plugged into an external power source and whether the self-contained climate controlled storage unit is being lifted based on the monitored weight, such that when the power source is plugged into the external power source and being lifted, the system controller provides an alert.

Aspect 13. The electrically powered portable self-contained climate controlled storage unit according to Aspect 12, wherein the system controller turns off charging when the system controller determines that the self-contained climate controlled storage unit is lifted.

Aspect 14. The electrically powered portable self-contained climate controlled storage unit according to any of Aspects 1-13, wherein, based on the monitored weight and/or orientation of the self-contained climate controlled storage unit, the system controller determines an inclination angle of the self-contained controlled storage unit, wherein when the inclination angle is above a predetermined angle, the system controller turns off the climate control system.

Aspect 15. The electrically powered portable self-contained climate controlled storage unit according to Aspect 9, wherein, based on the monitored weight and/or orientation of the self-contained climate controlled storage unit, the system controller determines a weight distribution of cargo products stored in the climate controlled space, wherein when the weight distribution is above a predetermined value, the system controller provides the alert to redistribute the cargo products inside the climate controlled space.

Aspect 16. A method for monitoring a weight and/or orientation of an electrically powered portable self-contained climate controlled storage unit comprising:

monitoring a weight and/or orientation associated with the self-contained climate controlled storage unit using at least one sensor;

determining, based on the monitored weight and/or orientation, whether the self-contained climate controlled storage unit is in an unsafe operating condition; and upon determining that the climate controlled storage unit is in the unsafe operating condition, adjusting operation and/or the orientation of the self-contained climate controlled storage unit, wherein the self-contained climate controlled storage unit comprises a base comprising an enclosure and at least one foot for supporting the self-contained climate controlled storage unit, a climate controlled space affixed above the base, and a climate control system for providing climate control to the climate controlled space that is provided in the enclosure.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. An electrically powered portable self-contained climate controlled storage unit, comprising:

a base comprising an enclosure and at least one foot for supporting the self-contained climate controlled storage unit;

a climate controlled space affixed above the base;

a climate control system for providing climate control to the climate controlled space, the climate control system provided in the enclosure;

at least one sensor for monitoring a weight and/or orientation associated with the self-contained climate controlled storage unit; and a system controller connected to the self-contained climate controlled storage unit, wherein the system controller is configured to determine an unsafe operating condition of the self-contained climate controlled storage unit based on the weight and/or orientation associated with the self-contained climate controlled storage unit monitored by the sensor, wherein, based on the monitored weight and/or orientation of the self-contained climate controlled storage unit, the system controller determines an inclination angle of the self-contained controlled storage unit, wherein when the inclination angle is above a predetermined angle, the system controller turns off the climate control system.

2. The electrically powered portable self-contained climate controlled storage unit according to claim 1, further comprising an accelerometer, wherein the at least one sensor monitors the weight and the accelerometer monitors an acceleration of the self-contained climate controlled storage unit.

3. The electrically powered portable self-contained climate controlled storage unit according to claim 1, wherein the at least one sensor monitors the weight of cargo product in the climate controlled space.

4. The electrically powered portable self-contained climate controlled storage unit according to claim 1, wherein the sensor is a pressure sensor or a load sensor or cell.

5. The electrically powered portable self-contained climate controlled storage unit according to claim 1, further comprising a power source for supplying power to the climate control system, the power source provided in the enclosure of the base.

6. The electrically powered portable self-contained climate controlled storage unit according to claim 5, wherein the power source includes one or more batteries.

7. The electrically powered portable self-contained climate controlled storage unit according to claim 1, wherein the climate controlled space includes a door for opening and closing an interior space in the climate controlled space.

8. The electrically powered portable self-contained climate controlled storage unit according to claim 1, wherein the base comprises a plurality of feet for supporting the self-contained climate controlled storage unit.

9. The electrically powered portable self-contained climate controlled storage unit according to claim 8, wherein the sensor is a load cell or sensor that is provided in at least one of the plurality of feet of the base.

10. The electrically powered portable self-contained climate controlled storage unit according to claim 9, wherein, based on the monitored weight and/or orientation of the self-contained climate controlled storage unit, the system controller determines a weight distribution of cargo products stored in the climate controlled space, wherein when the weight distribution is above a predetermined value, the system controller provides the alert to redistribute the cargo products inside the climate controlled space.

11. The electrically powered portable self-contained climate controlled storage unit according to claim 1, wherein the sensor is a load cell provided between the base and the climate controlled space.

12. The electrically powered portable self-contained climate controlled storage unit according to claim 1, wherein the self-contained climate controlled storage unit is configured such that a center of mass of the self-contained climate controlled storage unit is located along a central axis of the base.

13. An electrically powered portable self-contained climate controlled storage unit, comprising:

a base comprising an enclosure and at least one foot for supporting the self-contained climate controlled storage unit;

a climate controlled space affixed above the base;

a climate control system for providing climate control to the climate controlled space, the climate control system provided in the enclosure;

at least one sensor for monitoring a weight and/or orientation associated with the self-contained climate controlled storage unit;

a power source for supplying power to the climate control system, the power source provided in the enclosure of the base; and a system controller connected to the self-contained climate controlled storage unit, wherein the system controller is configured to determine an unsafe operating condition of the self-contained climate controlled storage unit based on the weight and/or orientation associated with the self-contained climate controlled storage unit monitored by the sensor, wherein the system controller is configured to determine whether the power source is plugged into an external power source and whether the self-contained climate controlled storage unit is being lifted based on the monitored weight, such that when the power source is plugged into the external power source and being lifted, the system controller provides an alert.

14. The electrically powered portable self-contained climate controlled storage unit according to claim 13, wherein the system controller turns off charging when the system controller determines that the self-contained climate controlled storage unit is lifted.

15. A method for monitoring a weight and/or orientation of an electrically powered portable self-contained climate controlled storage unit comprising:

monitoring a weight and/or orientation associated with the self-contained climate controlled storage unit using at least one sensor;

determining, based on the monitored weight and/or orientation, whether the self-contained climate controlled storage unit is in an unsafe operating condition; and upon determining that the climate controlled storage unit is in the unsafe operating condition, adjusting operation and/or the orientation of the self-contained climate controlled storage unit, wherein the self-contained climate controlled storage unit comprises a base comprising an enclosure and at least one foot for supporting the self-contained climate controlled storage unit, a climate controlled space affixed above the base, and a climate control system for providing climate control to the climate controlled space that is provided in the enclosure, wherein the determining whether the self-contained climate controlled storage unit is in the unsafe operating condition, based on the monitored weight and/or orientation, the method further includes determining an inclination angle of the self-contained controlled storage unit, wherein when the inclination angle is above a predetermined angle, the method includes turning off the climate control system.

* * * * *